3,123,477
SYSTEM FOR ANTE-MORTEM INJECTION
William O. Reece, Oak Lawn, Ill., assignor to Swift & Company, Chicago, Ill., a corporation of Illinois
No Drawing. Filed July 19, 1960, Ser. No. 43,744
11 Claims. (Cl. 99—107)

The present invention relates in general to an improved system for the ante-mortem injection of enzymes or other materials into animals. More specifically, my invention is directed to a method of handling meat-bearing animals which is adaptable to integrate ante-mortem enzyme injection into the in-line dispatching system of a meat processing plant.

A method of improving the tenderness of meat by the ante-mortem injection of proteolytic enzyme into the vascular system of animals is disclosed and claimed in U.S. Patent No. 2,903,362, Beuk et al., September 8, 1959. Such a system requires mechanical, or physical, restraint of the living animal prior to enzyme injection, during injection, and preferably during any holding period which may be deemed necessary to obtain uniform distribution of the enzyme prior to dispatching the animal. It has been found that physical restraint of the animals for this purpose requires special equipment, increased time and labor, and added floor space on or near the kill floor.

It is a principal object of my invention to provide a method of handling animals which substantially eliminates the requirements for special restraining equipment and added floor space in the slaughtering plant when it is desired to inject enzyme into the living animal. My method can also reduce the amount of labor required and allow for a decrease in the time required to slaughter an animal injected with enzyme.

An additional object of my invention is to provide a method whereby an ante-mortem injection system is substantially fully integrated into the in-line dispatching layout of a slaughterhouse.

Another problem often encountered when physical restraint of the animal is used is that caused by the animal attempting to free himself. In many types of restraining equipment and with manual holding of the animal, some movement by the animal is possible. Depending upon the type of restraint used, this movement can be sufficient to cause the operator to improperly insert the injection equipment, to cause displacement of the equipment after injection, to cause loss of solution due to dropping and/or breaking of injection apparatus, and to conceivably cause injury to the operator and/or the animal. Product impairment may result. It is a further object of my invention to substantially eliminate voluntary movement of the animal during injection.

I have discovered that a living meat-bearing animal that is to be injected with enzyme or other solution can be handled directly in the in-line dispatching system of a livestock slaughtering operation provided that prior to injection the animal is rendered insensible in such a manner that it will remain unconscious and will have a relatively steady heart action for at least about 20 seconds after rendering unconscious, and preferably for 1–5 minutes. The animal can then be dispatched, as, for example, by sticking and removing blood from the animal preferably prior to regaining its senses. In certain circumstances, if the solution is parenterally injected other than into the vascular system of the animal, the duration of steady heart action may become less critical.

This system of handling presents a substantially insensible animal for injection, thereby substantially eliminating the problems attendant injection under circumstances where the animal struggles to move and may succeed therein to at least a limited degree. An added advantage is realized in that the rise in blood pressure which may occur due to the pressure of mechanical restraining and/or the animal's alarm with regard to the unfamiliar situation in which he finds himself is substantially reduced.

Any method of rendering the animal incapable or bereft of feeling or sensation for the predetermined required period of time and, where the animal's heart is used to distribute the injectant through the circulatory system, in a manner such that the animal's heart action will be relatively steady, and preferably moderate to strong, for at least 20 seconds, is satisfactory. Examples of means for insensibilizing the animal include concussion stunning, penetration stunning, electrical stunning, and administration of anesthetics and asphyxiants.

Animals can be rendered unconscious by means of a stunning force applied to the head area of the animals. This stunning force can be mechanical pressure (often spoken of as concussion and penetration stunning) or an electric current (spoken of as electrical stunning).

Concussion and penetration stunning as a means of immobilization prior to enzyme injection (as for example, an operator striking the animal on the head with a sledge hammer or the use of a Remington stunning device with a concussion or penetrating head) is well suited for animals such as cattle, sheep and calves. In the majority of cases, a single stunning blow will be sufficient, although in certain instances two or three blows will be required. A point that must be kept in mind, however, is that this type of stunning can result in insufficient heart activity in some animals after several minutes. It is, therefore, suggested that care be taken to ensure that enzyme injection is accomplished before cessation of relatively steady heart action. As a guide to the approximate time period prior to cessation of heart activity in 35 grade and 22 grade cattle, it has been determined probable that 95% of 35 grade cattle will exhibit heart activity for 3–16.5 minutes and 95% of 22 grade cattle will exhibit heart activity for 4.5–10 minutes.

Electrical stunning, such as by applying an electric current to the head of an animal at a potential above about 110 volts and preferably about 220 or more volts for a selected time interval sufficient to ensure unconsciousness of the animal, is well suited to rendering hogs and other animals insensible. Heart action is usually strong in animals that have been electrically stunned. However, it has been found that for some reason there is sometimes an extreme rise in the blood pressure of an animal which has been electrically stunned, necessitating that it must be dispatched within a very short period of time, in some cases a matter of less than a minute if it is desired to avoid the possibility of hemorrhage. It is therefore again suggested that enzyme injection proceed promptly after stunning so that the animal may be dispatched preferably prior to regaining consciousness and prior to the advent of adverse physiological complications. If hemorrhage is not an undesirable occurrence in the particular set of circumstances, time of injection becomes less critical.

In certain instances, anesthesia-producing agents can be utilized to render the animal unconscious. Anesthesia is used to denote a state of paralysis of the sensory apparatus of the animal and would include paralysis produced by hypnotic agents, and anesthetics generally resulting in a state of unconsciousness. The loss of sensation is preferably accomplished by reversibly depressing the activity of nervous tissue. However, in certain instances, providing time for enzyme or other distribution is maintained, it is feasible to cause irreversible central nervous system depression and ultimately death by the administration of anesthesia-producing agents. Examples of anesthesia-producing agents that can be employed include, but are not limited to, inhalants, such as ether, chloroform, cyclopropane, nitrous oxide, ethylene, vinyl ether and ethyl chloride, and agents which can be injected, such as the barbiturates, including amobarbital sodium, hexabarbital sodium, pentobarbital sodium, thiopental sodium, thialbarbitone sodium and thiamylal sodium, and other central nurvous system depressants such as chloral hydrate, magnesium sulfate, combinations of the last two mentioned ingredients with and without pentobarbital sodium, and betanaphthoxyethanol with thialbarbitone sodium. Asphyxiant gases, alone or in combination, such as carbon dioxide, nitrogen and other inert gases, such as helium, are also feasible for use in rendering the animal insensible. It is desirable to ensure that enzyme injection is completed before the animal regains consciousness. In certain installations the animal can also be bled before regaining its senses. In certain other installations it may be desirable to anesthetize the animal and inject enzyme while the animal is thereby rendered insensible and to thereafter stun the animal to allow additional time wherein the animal is immobile before it is necessary to bleed the animal.

As has been brought out previously, it is often advisable to inject the animal with enzyme solution promptly after insensibilization so that adequate time is obtained after the injection and prior to the necessity for bleeding the animal for substantially uniform distribution of enzyme throughout the vascular system of the animal. Relatively uniform distribution will be attained if the enzyme solution gets into the capillary network. The enzyme solution if continuously injected into the vascular system will generally get into the capillaries if the solution is in the vascular system of an animal with a relatively steady heart action for at least one-half the circulation time of the animal. By circulation time I refer to the time for the blood to flow through the arterial system of the animal. The circulation time in cattle is approximately one minute; in sheep approximately 1.1 minutes. The circulation time for livestock will usually range between 45-90 seconds.

It is recommended that the animal be dispatched prior to its regaining consciousness particularly in view of the humane slaughter legislation. However, if the animal does regain consciousness after enzyme injection, the advantages derived from having had the animal insensibilized prior to injection will still be obtained and the animal can thereafter be dispatched, preferably after again being rendered insensible.

The following examples are for the purposes of illustration only and are not to be construed as limiting on the scope of the invention:

*Example I*

A U.S. Good grade steer was driven to a stunning station where it was rendered unconscious by means of one blow from a captive bolt hammer device (Remington stunning device with a penetrating head). Two minutes thereafter the animal was injected with 50 mg./lb. of papain solution. Eight minutes after injection the animal was stuck, bled, and dressed. The animal exhibited respiratory and heart activity until the time of sticking. The animal had not regained consciousness prior to sticking. Roasts from this animal were cooked by placing them flat side up on racks in shallow roasting pans in 325° F. ovens. Cooking and eating qualities of the roasts were evaluated according to the following arbitrary scale:

10 _____ Excellent.
7-9 _____ Good.
4-6 _____ Fair.
3 _____ Poor.
2 _____ Very poor.
1 _____ Unsatisfactory.

The following ratings were made:

|  | Tenderness | Texture |
| --- | --- | --- |
| Standing rib roast | 9.0 | 10.0 |
| Chuck roll | 9.0 | 10.0 |

*Example II*

A 150 pound ewe was rendered unconscious by the delivery of 330 volts of electricity to its head for 2 seconds. The animal dropped immediately and was intravenously injected, without need for restraint, with papain solution until 40 mg. papain solution per pound live weight had been injected. The animal remained unconscious for approximately one minute, and had a strong heart action. The animal then got up and was subsequently again rendered unconscious, struck, and bled.

*Example III*

A 240 pound hog was driven in the regular manner toward the sticking station. At a point along the path of travel the animal was intraperitoneally injected with an aqueous solution containing 12% chloral hydrate and 6% magnesium sulfate at a dosage of 1 ml./pound body weight. The animal was thereby anesthetized. After being rendered insensible in this manner, the animal was intravenously injected with papain solution in the amount of approximately 100 mg. papain per pound live weight. Heart action remained strong. Fifteen minutes after injection of enzyme solution the animal was dispatched, prior to having regained consciousness.

*Example IV*

A 130 pound sheep was driven toward a sticking station. Prior to reaching that station an operator places a cone containing cotton saturated with ether over the animal's nose. Within a matter of 2 minutes the animal was in light surgical anesthesia. The animal was then injected, through the vena cava and without need for restraint, with 40 mg. papain solution per pound live weight. The animal was dispatched approximately one minute after enzyme injection and prior to regaining consciousness.

*Example V*

A 140 pound hog was driven toward the sticking station. Prior to reaching that station it was driven into an enclosed chamber where it was exposed to an "Exalene" atmosphere comprising a mixture of approximately 88% nitrogen, 10% carbon dioxide, and 2% oxygen. The hog dropped to the floor of the chamber in about 20 seconds, exhibiting less violent motion as it tried to breath than was noted with a straight carbon dioxide atmosphere. Immediately after the animal was down it was removed from the asphyxiant atmosphere and injected, through the anterior vena cava, with a papain solution to a dosage of 100 mg./lb. live weight. Within about 15 seconds after removal from the gas mixture slight corneal reflux returned but the animal was still quiet and immobile. The hog was dispatched while still immobile, approximately 30 seconds after commencement of enzyme injection. The viscera of the dispatched animal was examined and found to be free from hemorrhage.

Obviously many modifications and variations of the invention as hereinbefore set forth may be made without departing from the spirit and scope thereof, and therefore only such limitations should be imposed as are indicated in the appended claims.

I claim:

1. The method of handling an animal in slaughtering operation comprising: rendering said animal unconscious by stunning in a manner which insures steady heart action in said animal for about 20 seconds to about 5 minutes, parenterally injecting a tenderizing amount of a proteolytic enzyme solution into the vascular system of said animal while said animal is unconscious and while said animal has steady heart action and subsequently while said animal is unconscious removing blood from said animal.

2. The method of claim 1 wherein said animal is rendered unconscious by means of mechanical stunning.

3. The method of claim 1 wherein said animal is rendered unconscious by means of electrical stunning.

4. The method of claim 1 wherein said animal is rendered unconscious by means of anesthesia-producing agents selected from the group consisting of ether, chloroform, cyclopropane, nitrous oxide, ethylene, vinyl ether, ethyl chloride, amobarbital sodium, hexabarbital sodium, pentobarbital sodium, thiopental sodium, thialbarbitone sodium, thiamylal sodium, chloral hydrate, magnesium sulfate, carbon dioxide, nitrogen, helium, and combinations thereof.

5. The method of slaughtering animals which comprises: rendering said animals unconscious by means of a stunning force applied to the head area of said animals, injecting a tenderizing amount of an enzyme solution into the vascular system of said living unconscious animals while the heart action of said animals is relatively steady, and bleeding said animals after said enzyme solution is relatively uniformly distributed throughout said vascular system.

6. The method of claim 5 wherein said stunning force is an electric current.

7. The method of claim 1 wherein the enzyme is used in an amount of from about 40 milligrams to about 100 milligrams per pound live weight.

8. In the method of slaughtering animals wherein living animals are injected with an enzyme solution and thereafter blood is drained from the circulatory system of said animals, the improvement comprising: rendering said animals insensible by stunning prior to enzyme injection in such a manner that they will remain unconscious and will have a relatively steady heart action for at least about 20 seconds, introducing a tenderizing amount of a proteolytic enzyme into the vascular system of said unconscious animals while said animals have steady heart action, and subsequently slaughtering said animals while said animals are still in the unconscious state.

9. The method of claim 8 wherein the proteolytic enzyme is employed in an amount of from 40–100 milligrams per pound live weight.

10. The method of claim 5 wherein said animals are rendered unconscious by means of mechanical stunning.

11. The method of claim 5 wherein the enzyme is used in an amount of from about 40 milligrams to about 100 milligrams per pound live weight.

References Cited in the file of this patent

UNITED STATES PATENTS

| | | |
|---|---|---|
| 231,807 | Jones | Aug. 31, 1880 |
| 1,857,658 | Pfretzschner | May 10, 1932 |
| 2,895,164 | Murphy | July 21, 1959 |
| 2,903,362 | Beuk et al. | Sept. 8, 1959 |
| 2,977,627 | Morse et al. | Apr. 4, 1961 |

OTHER REFERENCES

Sollman: "A Manual of Pharmacology and Its Application to Therapeutics and Toxicology," 8th Ed., 1957, pp. 422–423.

UNITED STATES PATENT OFFICE
CERTIFICATE OF CORRECTION

Patent No. 3,123,477                                               March 3, 1964

William O. Reece

It is hereby certified that error appears in the above numbered patent requiring correction and that the said Letters Patent should read as corrected below.

Column 3, line 50, after "animal." insert the following sentence:

> This observation is not a part of my invention but forms the basis for an invention of John M. Hogan and Harry F. Bernholdt, disclosed and claimed in co-pending application, S.N. 164,381, filed January 4, 1962.

column 4, line 4, for "flat" read -- fat --; line 31, for "struck" read -- stuck --; line 72, for "reflux" read -- reflex --.

Signed and sealed this 28th day of July 1964.

(SEAL)
Attest:

ESTON G. JOHNSON                                          EDWARD J. BRENNER
Attesting Officer                                         Commissioner of Patents